United States Patent
Hendley et al.

[15] 3,699,558
[45] Oct. 17, 1972

[54] ANGULAR POSITION SENSORS

[72] Inventors: Dennis Alfred Hendley, London, England; Sipko L. Boersma, Delft, Netherlands

[73] Assignee: Decca Limited, London, England

[22] Filed: July 13, 1970

[21] Appl. No.: 54,224

[30] Foreign Application Priority Data

July 14, 1969 Great Britain..........35,389/69

[52] U.S. Cl.....................340/196, 33/204 Q, 336/79
[51] Int. Cl. .............................................G08c 19/06
[58] Field of Search......................33/204 Q; 340/196

[56] References Cited

UNITED STATES PATENTS

| 705,482 | 7/1902 | Thiermann | 340/196 |
| 2,936,623 | 5/1960 | Quist | 340/196 |
| 3,217,308 | 11/1965 | Maxwell | 340/196 |
| 3,594,741 | 7/1971 | Ellison | 340/196 |

*Primary Examiner*—Thomas B. Habecker
*Attorney*—Mawhinney and Mawhinney

[57] ABSTRACT

A rotatable insulating disc carries a closed grid of conductors over one part of one side and a similar but open grid over another part. An oscillator is coupled to a coil which is parallel to the disc and produces a cyclically varying but symmetrical field through the disc. Two pairs of pick-up coils sense, for respective orthogonal directions, the distortion of the field by the closed grid and detector circuits coupled to the pick-up coils provide signals representing the sine and cosine of the angular position of the disc which may carry a compass needle.

13 Claims, 1 Drawing Figure

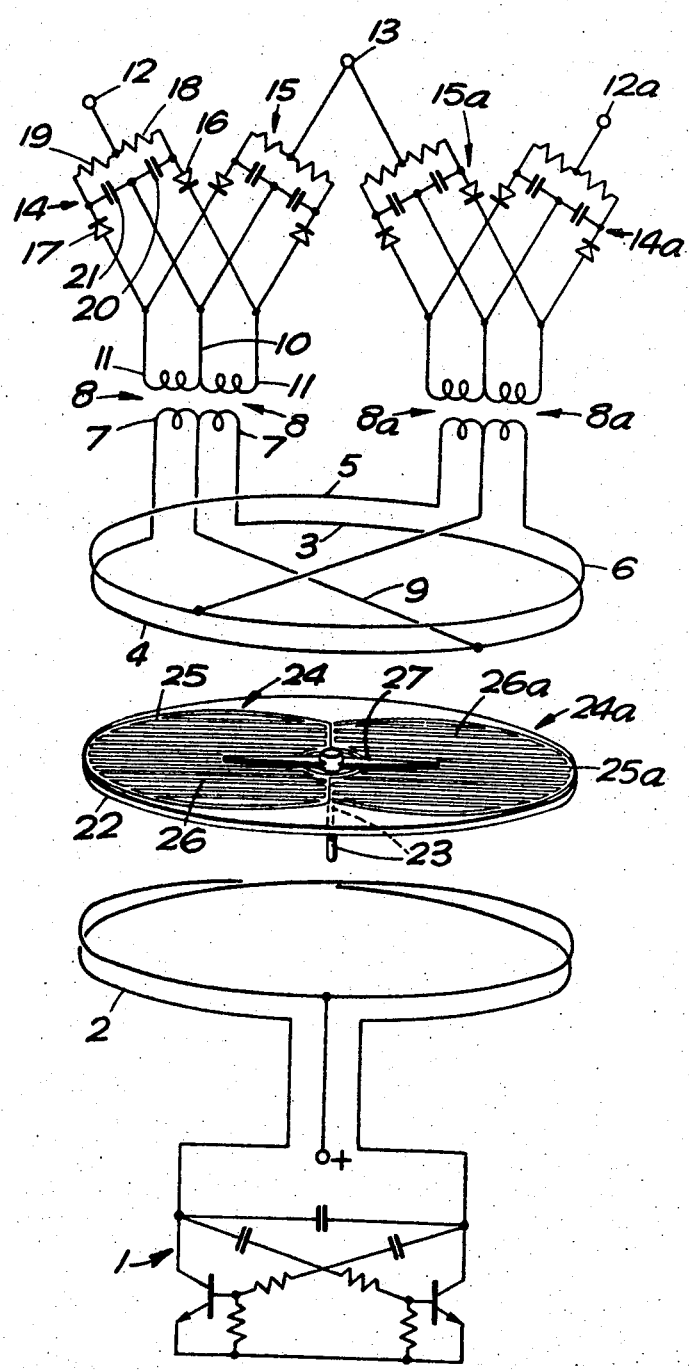

ANGULAR POSITION SENSORS

FIELD OF THE INVENTION

This invention relates to angular position sensors, that is to say devices for providing an indication of the angular position of a rotatable member. The invention is particularly suitable for providing an indication of the angular position of a compass needle.

SUMMARY OF THE INVENTION

According to the invention an angular position sensor for a rotatable member comprises means for producing a cyclically varying magnetic field that is spatially regular through a plane of rotation of the member, means on the member for distorting the field in accord with the member's angular position, means for sensing the distortion of the field in two orthogonal directions parallel to the said plane and means for deriving electrical signals representative of the sensed distortion in a respective direction.

With this construction it is readily possible to obtain signals of which one has maxima and minima corresponding to positions of the member in quadrature with the positions resulting in maxima and minima of the other signal. It is accordingly possible to obtain signals representing at least approximately the sine and cosine of the angular position of the member. The accuracy of this representation may be improved by careful design of the means for introducing the distortion: even so, in some circumstances a sufficiently accurate indication of the angular position can be obtained merely by detecting (for example) the minima of the signals and their equality.

Conveniently each sensing means comprises a pair of pickup coils spanning regions displaced in a respective one of two orthogonal directions parallel to the said plane; the means for deriving electrical signals may comprise means responsive to the difference between signals induced in the respective coils by the flux of the magnetic field therethrough. Conveniently detector circuits are arranged to form signals representing in magnitude and sense the sine and cosine of the angular position of the said member.

Conveniently each pair of coils span two abutting semicircular regions. The means for producing the magnetic field may comprise a transmitter coil disposed parallel to the said plane and an oscillator coupled to the coil for producing alternating current flow in the coil. A particularly convenient and potentially robust construction is provided by arranging the member between the transmitter coil and the pickup coils, the two pairs of pickup coils being arranged in spaced-apart parallel planes and embracing regions substantially coextensive with the area of the transmitter coil.

As indicated hereinbefore the invention is particularly suitable for use with magnetic compasses. The obtaining of an electrical indication of the position of a compass needle, especially for use in auto-pilots, has been difficult to achieve with relatively simple devices. In a construction in accord with the present invention the compass needle may be mounted for rotation with the aforementioned member. The magnetic field, owing to its regularity, will not affect the response of the needle to a planetary magnetic field. Moreover, the frequency of the cyclic variation of the field may be relatively high, for example in the region of 1 MHz., for the same purpose.

The means on the member conveniently comprise a conductive screen extending in said plane over part of the said member. The screen may comprise a closed grid of metallic conductors. It would be convenient to provide a similar grid over an opposite part of the member in order to obtain pivotal balance of the member. However, the 'balancing' grid would need to comprise an open network in order not to distort the magnetic field as does the closed grid.

BRIEF DESCRIPTION OF THE DRAWING

The accompanying drawing illustrates one preferred embodiment of the invention.

DESCRIPTION OF THE PREFERRED EMBODIMENT

In this example, a push-pull sine-wave oscillator 1 of frequency in the region of 1 MHz. is coupled to a circular transmitter coil 2 formed as a printed circuit on the surface of a thin insulating disc. For convenience of illustration the disc itself is not shown. The number of turns in the coil is optional and depends on the impedance necessary to match the output impedance of the oscillator 1. When energized by the oscillator 1 the coil 2 produces an axial field which at least near the coil's axis is substantially symmetrical in a plane transverse the axis. Parallel to and spaced apart from the coil 2 is another insulating disc (not shown for convenience). Each side of this disc carries a pair of pickup coils (3, 4 and 5, 6 respectively). Each pair of coils spans two abutting semicircular regions constituting a circular region coaxial with the area of the coil 2 energized by the oscillator 1. The two pairs of coils are in quadrature: thus if the regions spanned by one pair 3, 4 are divided by an 'East–West' line, the regions spanned by the other pair 5, 6 are divided by a 'North–South' line. The pickup coils are single turn coils; each pair share a conductor extending along the common or dividing diameter of the respective two regions.

For each coil in the pair of coils 3 and 4 the primary winding 7 of a respective transformer 8 is coupled across a gap provided between the end of the respective diametral conductor 9 and the adjacent end of the semicircular part of each coil. The secondary windings 11 of the transformers 8 are each coupled to each of two detector circuits 14 and 15. The circuit 14 includes oppositely poled diodes 16 and 17 and a series pair of output resistors 18 and 19 in shunt with smoothing capacitors 20, 21 respectively. The secondary windings 11 are coupled jointly by a conductor 10 to the junction of the capacitors 20 and 21. The terminal 12 is connected to the junction of the resistors 18 and 19. The circuit 14 forms at the terminal 12 a signal corresponding to the difference between the maximum magnitude of the signal flowing in the coil 3 for 'positive' half-cycles and the maximum magnitude of the signal flowing in the coil 4 during 'negative' half-cycles. The similar circuit 15 forms a similar signal derived from the 'negative' half-cycles of the signal induced in the coil 3 and the 'positive' half-cycles of the signal induced in the coil 4. The signals induced in the coils 3 and 4 will be different owing to distortion introduced in a manner to be described.

A circuit 14a corresponding to the circuit 14 is connected between a 'cosine' output 12a and the secondary windings of transformers 8a connected to the coils 5 and 6 as the transformers 8 are connected to the coils 3 and 4. A circuit 15a corresponding to the circuit 15 is connected between the transformers 8a and the terminal 12. The outputs at the pairs (12, 13) and (12a, 13a) of the output terminals represent in magnitude and sense the sine and cosine of the angular position of a disc 22.

Mounted for rotation about the common axis of the coils, between the pickup coils and the transmitter coil, is the insulating disc 22 mounted on a pivot 23 for rotation with a compass needle 27. The disc 22 bears a printed circuit on its upper surface, that is to say the surface nearer the pickup coils. On one half of the upper surface of the printed circuit is formed a conductive grid 24 in the form of a closed ring 25 with parallel bars 26 extending across the ring 25. On the other half of the disc 22 there is provided a similar, but open grid 24a, the bars 26a of the grid being separated from part of the outer ring 25a so as not to constitute a closed circuit.

With this construction, the closed barred grid acts as a short-circuited coil and thereby as a screen; accordingly the magnetic field above it will be considerably reduced in intensity compared with the field immediately above the other part of the disc 22. This distortion of the magnetic field is picked up by the sensing coils to provide outputs corresponding to the angular position of the rotatable disc 22. With careful design of the screen the electrical outputs can represent accurately the sine and cosine of that angular position.

The coils and disc may be disposed inside a cylindrical container containing a suitable liquid.

The compass needle is preferably aligned with one of the axes of symmetry of the grids.

We claim:

1. An angular position sensor for a compass needle, said sensor comprising a rotatable member mounted for rotation in accord with the rotation of said needle and coaxially therewith, said member extending in a plane normal to its axis of rotation, means for producing a cyclically varying magnetic field that is spatially regular about the axis of rotation of the said member, a conductive closed grid means of parallel conductors disposed on the said member and extending over it normal to said axis, whereby said field is distorted in accord with the member's angular position, respective means for sensing the distortion of the field in each of two orthogonal directions normal to said axis and circuit means coupled to said means for sensing for deriving electrical signals representative of the sensed distortion in each direction.

2. An angular position sensor as claimed in claim 1 in which the means for sensing each comprise two pick-up coils spanning regions displaced in a respective one of two orthogonal directions parallel to the said plane and the means for deriving electrical signals comprise means responsive to the difference between signals induced in the respective coils by the flux of the magnetic field.

3. An angular position sensor as claimed in claim 2 in which detector circuits are coupled to the pick-up coils for producing signals representative of the sine and cosine of the angular position of the member.

4. An angular position sensor as claimed in claim 2 in which each pair of coils span two abutting semicircular regions.

5. An angular position sensor as claimed in claim 4 in which the means for producing the magnetic field comprises a coil disposed parallel to the said plane and an electrical oscillator coupled to the coil.

6. An angular position sensor as claimed in claim 5 in which the member is disposed between the transmitting coil and the two pairs of pickup coils.

7. An angular position sensor as claimed in claim 6 in which the two pairs of pickup coils are arranged in spaced apart parallel planes and embrace regions substantially co-extensive with the area of the transmitting coil.

8. An angular position sensor as claimed in claim 7 in which the means for distorting comprises a conductive screen extending in said plane over part of the said member.

9. An angular position sensor as claimed in claim 8 in which the screen comprises a closed grid of conductors.

10. An angular position sensor as claimed in claim 9 in which over a part of the member, opposite the part which carries the closed grid of conductors, is an open grid of otherwise similar configuration to that of the closed grid.

11. An angular position sensor for a compass needle which is rotatable about an axis, said sensor comprising an insulating disc mounted to move with said needle for rotation about said axis; a closed circuit gridded screen means of parallel conductors extending over part of said member on a surface thereof normal to said axis; a first coil disposed in a plane parallel to said disc and spaced from said disc along said axis; and a pair of coils extending in a second plane parallel to the said disc and spaced along said axis therefrom on the side of said disc remoter from said first coil, said coils of said pair of coils being spaced apart in said second plane.

12. An angular position sensor as set forth in claim 11, further comprising a second pair of coils extending in a third plane parallel to said disc and spaced along said axis therefrom on the side thereof remoter from said first coil, said coils of said second pair of coils being spaced apart in said third plane.

13. An angular position sensor as set forth in claim 12, further comprising signal generating means coupled to said first coil and respective circuits each associated with one of said pairs of coils for determining differences in signals induced in the coils of the respective pair.

* * * * *